Dec. 6, 1966  W. L. MARTIN ET AL  3,289,758
METHOD FOR RECOVERING PETROLEUM

Filed July 11, 1962  2 Sheets-Sheet 1

INVENTORS,
WILLIAM L. MARTIN &
MARTIN FELSENTHAL
BY
L. David Chapman
ATTORNEY

United States Patent Office 3,289,758
Patented Dec. 6, 1966

3,289,758
METHOD FOR RECOVERING PETROLEUM
William L. Martin and Martin Felsenthal, Ponca City, Okla., assignors to Continental Oil Company, Ponca City, Okla., a corporation of Oklahoma
Filed July 11, 1962, Ser. No. 209,139
10 Claims. (Cl. 166—9)

This invention relates generally to improvements in the art of recovering petroleum oil from subsurface strata, and more particularly to what is commonly known in the art as secondary recovery. This is a method of recovering petroleum oil from subsurface hydrocarbon-bearing strata overlying a water-bearing stratum after recovery of the oil has become uneconomical through natural flow of the oil and through pumping methods due to high water-to-oil ratios.

Secondary recovery by means of water and gas floods is now common practice in the oil-producing industry. In this type of recovery operation, the flooding fluid (water or gas) is forced radially into an oil-bearing subsurface strata through an injection well located centrally with respect to a plurality of recovery wells. The principle of the flood is that the flooding fluid physically forces oil radially outward from the injection well into the recovery wells where the oil is captured, either by natural flow upwardly through the recovery wells or by any suitable lifting mechanisms.

Water floods and gas floods recover an appreciable portion of oil which cannot be recovered by the natural gravitation of the oil into producing wells. However, present-day gas floods and water floods leave a substantial portion of the oil in place in the oil-bearing strata. Perhaps the greatest shortcoming of present-day gas and water floods is that the flooding fluid tends to "channel" or "finger" through the oil-bearing strata toward the recovery wells, rather than providing a solid front moving outwardly from the injection well in the nature of an expanding circle. The fingering of the flooding fluid bypasses an appreciable portion of the oil-bearing strata and leaves the oil therein untouched. This problem is particularly acute when the flooding fluid is gas, and the problem has only been very partially alleviated by increasing the pressure in the subsurface strata to such an extent that the gas becomes miscible with the oil. Water also has a great tendency to finger through oil-bearing strata, which becomes more pronounced as the viscosity of the oil increases. Furthermore, oil-bearing strata frequently immediately overlie water-bearing strata and the flooding water tends to move through the water-bearing strata rather than the oil-bearing strata during a flooding operation.

An important object of this invention is to increase the percentage of oil recovered from subsurface oil-bearing strata.

Another object of this invention is to minimize fingering of the flooding water during a secondary recovery operation.

Another object of this invention is to decrease the permeability of water streaks in oil-bearing strata to the flow of flooding water, such that the flooding water will tend to flow through the oil-saturated portions of the strata and remove oil therefrom.

A further object of this invention is to provide a novel combination water and gas flood wherein the flow paths of the flooding water are controlled to maximize the recovery of oil from subsurface strata.

A further object of this invention is to maximize oil recovery from oil-bearing strata while minimizing the flow of water into a production well from a water-bearing stratum located below the well, that is, minimize water coning.

A still further object of this invention is to provide a method of secondary recovery which is simple to perform and which is economical.

Other objects and advantages of the invention will be evident from the following detailed description, when read in conjunction with the accompanying drawings which illustrate the invention.

Broadly, the present invention contemplates a method for the secondary recovery of oil from a reservoir wherein the hydrocarbon-bearing stratum (an oil zone) is located adjacent and above a water-bearing stratum (a water zone). The initial step of the method is to inject gas into the water zone until the zone is substantially saturated with gas, decreasing the relative permeability to water, and thereafter water is injected into the oil zone. This water injection is continued until the ratio of water-to-oil entering the production wells is undesirably high due to the tendency of water to finger through the oil zone rather than move as a solid front, whereupon the water injection is suspended and gas is then injected into the oil zone. This gas tends to follow the water streaks and materially decreases the relative permeability of these portions of the strata to the flow of water. Thus, when water is again injected into the oil-bearing formation, the water will flow through new paths and provide an increased recovery of oil. The water injected into the oil zone will tend to remain in the oil-bearing formation and will not channel through the lower water-bearing formation, particularly in reservoirs containing high viscosity crude oils. This method is particularly appropriate in recovering oil from reservoirs wherein the mobility of water is greater than the mobility of the oil contained therein.

Figure 2:
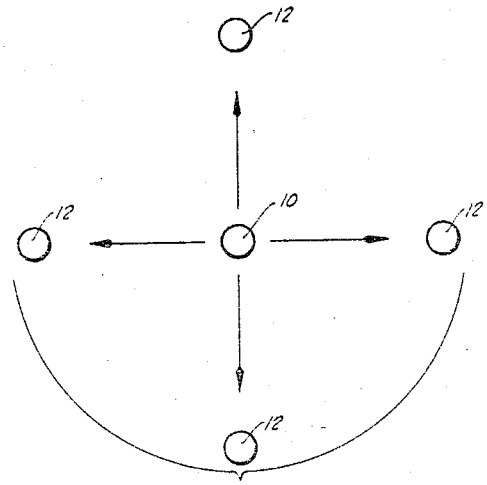
FIGURE 2 is a schematic plan view of a typical arrangement of injection and recovery wells for a recovery operation.
Figure 3:
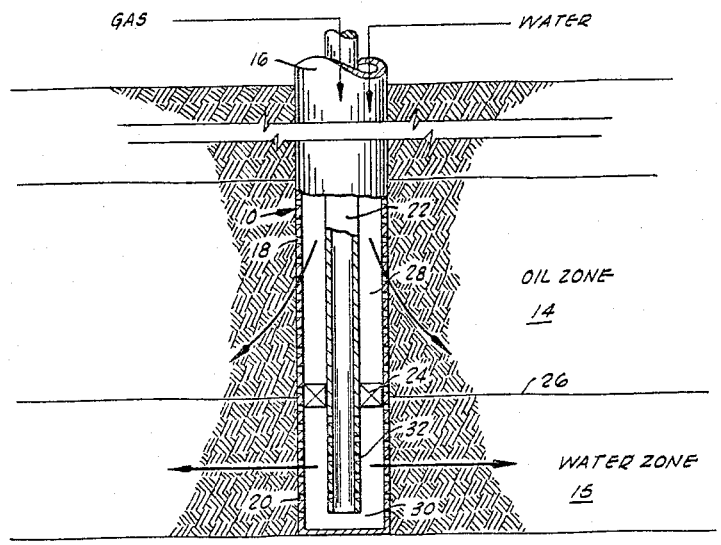
FIGURE 3 is a schematic vertical sectional view through an injection well.
Figure 4:
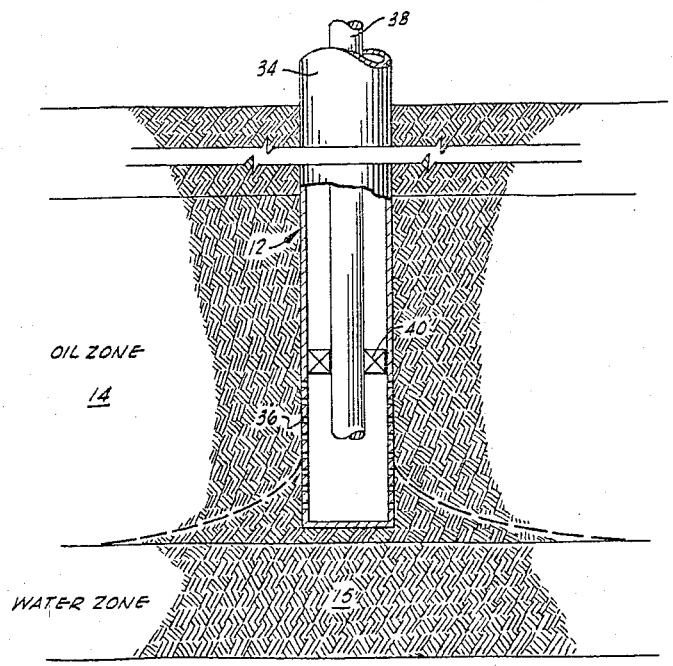
FIGURE 4 is a schematic vertical sectional view through a recovery well.

Referring to the drawings in detail, and particularly FIG. 2, reference character 10 designates an injection well which is surrounded by a plurality of circumferentially spaced recovery or production wells 12 in the usual fashion for a water-flooding operation. As shown in FIG. 3, the injection well extends downwardly through an oil-bearing subsurface stratum 14 which is designated "oil zone" in the drawing. When the oil zone 14 is immediately above a water-bearing formation 15 (named the "water zone" in the drawing), the injection well 10 also extends downwardly into and preferably through the water zone. As shown in FIG. 4, each production well 12 extends downwardly into the oil zone 14 terminating above the water zone 15. It will be readily understood by those skilled in the art that a portion of the wells 10 and 12 are frequently already drilled prior to a secondary recovery operation and it is usually only necessary to drill a portion of the wells 10 and 12 before initiating the secondary recovery operation.

As shown in FIG. 3, the injection well 10 is provided with the usual casing 16 extending downwardly through the oil zone 14 and the water zone 15. Perforations 18 are formed in the casing 16 throughout the height of the oil zone 14 and perforations 20 are formed in the casing 16 adjacent the water zone 15 and throughout the height thereof. A tubing 22 is suspended in the casing 16 and extends downwardly into the water zone 15. A suitable packer 24 is secured in the casing 16 around the tubing 22 at the level adjacent the interface 26 between the oil zone 14 and the water zone 15 to divide the annulus around the tubing 22 into an upper zone 28 and a lower zone 30. If desired, perforations 32 may also be provided in the lower end portion of the tubing 22 below the packer 24 to facilitate the radial flow of fluids from the tubing 22 into the lower zone 30.

Each recovery well 12 may be completed in any desired fashion depending upon the type of lifting method used for removing oil therefrom. For example, each recoverey well 12 may be provided with a casing 34 having perforations 36 therein extending through at least a substantial portion of the height of the oil zone 14 as shown in FIG. 4, or the recoverey well may be completed at the top of the oil zone. A tubing 38 may be suspended in the casing 34 and extended to the lower end portion of the casing 34 for pumping or flowing liquids from the lower portion of the casing. Also, a suitable packer 40 may be secured in the annulus between the tubing 38 and the casing 34 above the level of the perforations 36, if desired.

In accordance with the present invention, gas is first forced downwardly through the tubing 22, the lower zone 30 of the casing 16 and outwardly through the perforations 20 into and through the water zone 15. The packer 24 prevents the upward flow of the injected gas through the casing, such that the gas will be directed into the water zone 15. The pressure of the gas must obviously be greater than the bottom hole pressure in the injection well 10 and preferably approaches what is known as the overburden pressure. Overburden pressure is approximately equal to one pound per foot of depth of the well.

Figure 1:
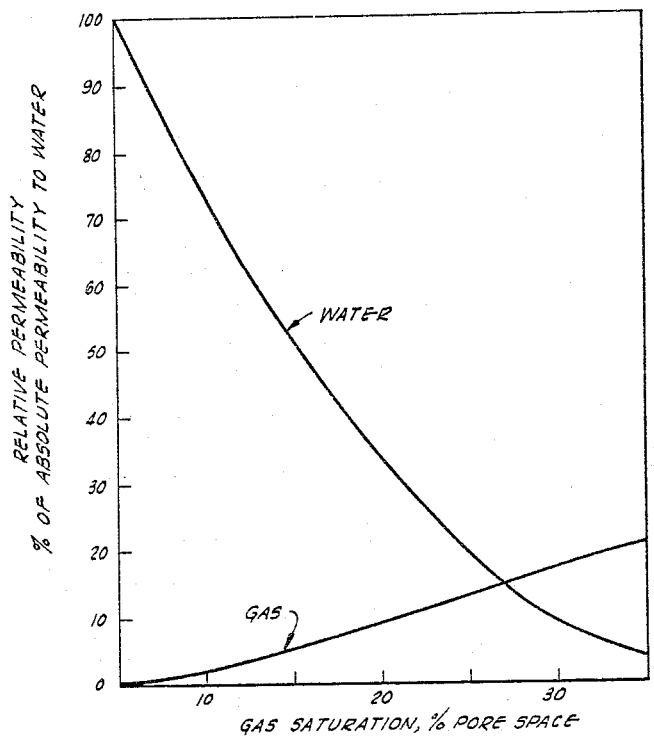
FIGURE 1 is a graph illustrating the decrease in permeability of a formation to water upon an increase in saturation of the formation with gas.

The purpose of injecting the gas into the water zone 15 is to decrease the effective permeability of the zone 15 to water which will be subsequently injected into the oil zone 14, as will be described below. As shown in FIG. 1, the relative permeability of a formation to water decreases rapidly as the gas saturation of the formation increases. Thus, the greater the percentage of the pore space of the water zone 15 that is filled with gas, the less will be the effective permeability of the formation to the flow of water.

After a sufficient amount of gas has been injected into the water zone 15 to saturate the respective formation around the injection well 10, water is then injected into the oil zone 14 through the injection well. The water is forced downwardly through the annulus between the tubing 22 and casing 16, into the zone 28, and then outwardly through the perforations 18 into and through the oil zone 14. The packer 24 prevents the flow of water downwardly directly into the lower zone 30 in the injection well and assures that the water will be injected into the oil zone 14. Also, since the relative permeability of the water zone 15 to water immediately around the injection well 10 has been substantially decreased by the previous injection of the gas into the zone 15, the water will tend to remain in the oil zone 14 and move radially outward from the injection well 10 through the oil zone.

The injection of gas through the water zone 15 is continued to maintain and further saturate the water zone radially outward from the injection well 10 ahead of the water flowing through the oil zone 14 to continually minimize the flow of injection water downwardly into the water zone 15 all the way between the injection well 10 and the recovery wells 12. It will be understood that the pressure of the injection water must be greater than the formation pressure of the oil zone 14, and this water pressure may also be sufficiently high so as to approach the overburden pressure in the zone 28 of the injection well.

The water being forced through the oil zone 14 displaces oil toward the recovery wells 12 in the usual fashion, such that oil will flow through the perforations 36 (FIG. 4) into the lower end portion of each recovery well 12 where it is removed through the tubing 38. The injection of water through the injection well 10 and through the oil zone 14 continues until the ratio of water to oil entering the production wells 12 approaches an undesirably high level, such as from 5:1 to 100:1, depending upon the economics of the particular operation. The injection of water through the injection well 10 is stopped upon reaching an undesirable water-to-oil ratio, and gas is then injected through the annulus between the casing 16 and tubing 22 and out through the perforations 18 into and through the oil zone 14. Gas injection is continued into the bottom water zone 15.

The gas injected into the oil zone 14 will follow the water channels extending through the oil zone by virtue of the previous injection of water. This is particularly true when the oil in the zone 14 is relatively viscous with respect to the injection water, i.e., the mobility of the water exceeds that of the oil. Thus, the gas will tend to decrease the permeability of these channels to the flow of water during a subsequent water injection step, as will be described. Gas is injected into the oil zone 14 until it is assured that a sufficient amount of gas is present in the oil zone to substantially saturate the water channels. Preferably, gas is injected into the oil zone 14 until the gas completely passes through the oil zone and enters the recovery wells 12 indicating complete gas saturation thereof. Gas injection in the oil zone 14 is then stopped, and water injection is again initiated.

The water injected in the oil zone 14 during this second water injection will tend to form new channels through the oil zone since the previous water channels have been decreased in water permeability by the gas injection. Thus, the newly injected water will displace additional amounts of oil from the zone 14 and force this oil into the recoverey wells 12. The alternate injection of water and gas into the oil zone 14, while maintaining substantial gas saturation in the water zone, is continued until the water-to-oil ratio of the liquids entering the production wells 12 is beyond the economical limit for the particular operation. These alternate injections of water and gas can also be initiated prior to actual breakthrough of these fluids into the production well, that is, gas injection can be commenced after injecting such water as will build up a substantial bank in the oil zone adjacent the injection well as evidenced by significant increase in injection pressure or water-to-oil ratio, and water injection can be commenced after injecting such gas as will saturate a substantial portion of the water injected as a bank adjacent the injection well.

The gas injected into the water zone 15, as well as the oil zone 14, may conveniently be air suitably compressed to the desired pressure. However, if corrosion is a problem, the injection gas may be inert, such as a combustion gas comprised of nitrogen and carbon oxides. Furthermore, if air tends to form emulsions with the oil, the injection gas may be a natural hydrocarbon gas which would decrease the separation problems for the recovered oil.

One of the important features of this invention is the minimizing of water coning at the recovery wells 12. As shown in FIG. 4 by the dashed lines extending upwardly at an angle from the water zone 15, water from the zone 15 tends to flow into the lower end portion of the recovery well 12 as soon as the pressure in the bottom of the recovery well is reduced, as by the removal of liquids from the well. This water-coning effect is also obtained in many production wells long prior to the time the wells are used in a secondary recovery operation, particularly in viscous-crude reservoirs. Therefore, those recovery wells 12 which were previously production wells may have a strong water-coning effect already produced prior to the secondary recovery operation. The gas injected into the water zone 15 will traverse the entire zone from the injection well 10 to the recovery wells 12 and tend to saturate the entire water zone, as well as that portion of the oil zone around the lower end of each recovery well 12 which has been subjected to water coning. Thus, the portions of the oil zone 14 tending to have a water-coning effect will have the water permeability thereof decreased. The result is that water coning during the secondary recovery method of this invention will be at a minimum and the only substantial amount of water entering any production well 12 will be the injection water which has traversed the oil zone 14.

From the foregoing, it will be apparent that the present invention provides a substantial improvement in the amount of oil recovered from a subsurface stratum, as compared with present-day gas floods and water floods. The water permeability of water channels formed through the subsurface oil-bearing strata is decreased by the injection of gas, such that subsequently injected water will form new channels through the oil-bearing strata and thereby remove additional amounts of oil. It will also be apparent that the channeling of injection water through a water zone below the oil zone is minimized for a further increase in the effectiveness of the injection water in displacing oil from the oil zone. It will further be apparent that the present method is simple to perform and is economical.

Changes may be made in the combination and arrangement of steps or procedures as heretofore set forth in the specification and illustrated in the drawings, it being understood that changes may be made in the embodiments disclosed without departing from the spirit and scope of the invention as defined in the following claims.

What is claimed is:

1. A method of recovering oil from an oil-bearing subsurface stratum traversed by an injection well and a spaced recovery well and having a water-bearing stratum therebelow traversed by said injection well, comprising the steps of:
    forcing gas through said water-bearing stratum from the injection well until the stratum is saturated with the gas;
    forcing water through said oil-bearing stratum from the injection well to displace oil from the stratum into the recovery well;
    recovering oil from the recovery well;
    discontinuing the flow of water through the injection well when the ratio of water-to-oil entering the recovery well reaches an undesirably high level; then
    forcing gas through said oil-bearing stratum from the injection well until at least a portion of the stratum is saturated with the gas; then
    again forcing water through the injection well and said oil-bearing stratum to displace additional quantities of oil from the stratum into the recovery well.

2. The method defined in claim 1 wherein the water and gas are alternately forced through the subsurface stratum from the injection well to the recovery well.

3. A method of recovering oil from an oil-bearing subsurface stratum having a water-bearing stratum therebelow, comprising the steps of:
    drilling an injection well through both the oil-bearing and water-bearing strata;
    drilling at least one recovery well into the oil-bearing stratum at a distance from the injection well;
    forcing gas through the injection well and into and through the water-bearing stratum to decrease the permeability of this stratum to water;
    forcing water through the injection well and into and through the oil-bearing stratum to displace oil into the recovery well; and
    recovering the oil from the recovery well.

4. The method defined in claim 3 wherein the gas is air.

5. The method defined in claim 3 wherein the gas is natural gas.

6. The method defined in claim 3 wherein the gas is combustion gas.

7. The method defined in claim 3 wherein the flow of water through the injection well is discontinued after the water reaches the recovery well, then gas is injected through the injection well and into and through the oil-bearing stratum until gas flowing through the oil-bearing stratum starts entering the recovery well, then again forcing water through the injection well and into and through the oil-bearing stratum to displace additional quantities of oil into the recovery well.

8. A method of recovering oil from an oil-bearing stratum having a water-bearing stratum therebelow, comprising the steps of:
    drilling an injection well through both the oil-bearing and water-bearing strata;
    installing a casing in the injection well from the top of the well through the oil-bearing and water-bearing strata;
    supporting a tubing in the injection well from the top of the well to the level of the water-bearing stratum;
    perforating the casing at the levels of both the oil-bearing and water-bearing strata;
    installing a packer around the tubing at the interface between the oil-bearing and water-bearing strata to seal the casing between the oil-bearing and water-bearing strata;
    drilling a recovery well into the oil-bearing stratum;
    completing said recovery well;
    forcing gas through the injection well tubing, the perforations in the casing below the packer and into and through the water-bearing stratum to the recovery well; and
    pumping water down through the casing around the tubing and through the perforations in the casing above the packer and into and through the oil-bearing stratum to displace oil from the oil-bearing stratum into the recovery well.

9. A method of recovering oil from an oil-bearing subsurface stratum traversed by an injection well and a spaced recovery well and having a water-bearing stratum therebelow traversed by the injection well, comprising the steps of:
    forcing gas through the water-bearing stratum from the injection well until the stratum is saturated with gas to reduce the relative permeability of the stratum to the flow of water therethrough; and
    alternately forcing water and gas into the oil-bearing stratum from the injection well to displace oil from the oil-bearing stratum into the recovery well.

10. The method defined in claim 9 wherein gas is forced into the oil-bearing stratum each time the pressure of the water in the injection well significantly increases, and forcing of gas into the oil-bearing stratum is discontinued after a sufficient amount of gas has been injected to saturate those portions of the oil-bearing stratum traversed by previously injected water.

References Cited by the Examiner

UNITED STATES PATENTS

| | | | |
|---|---|---|---|
| 2,347,769 | 5/1944 | Crites | 166—7 X |
| 3,096,821 | 7/1963 | Dyes | 166—9 |
| 3,148,730 | 9/1964 | Holbert | 166—9 |

JACOB L. NACKENOFF, *Primary Examiner.*

CHARLES E. O'CONNELL, *Examiner.*

T. A. ZALENSKI, S. J. NOVOSAD, *Assistant Examiners.*